United States Patent
Carroll et al.

(10) Patent No.: US 11,993,710 B2
(45) Date of Patent: May 28, 2024

(54) COMPOSITE SOLID STATE ELECTROLYTE AND LITHIUM ION BATTERY CONTAINING THE SAME

(71) Applicant: Wildcat Discovery Technologies, Inc., San Diego, CA (US)

(72) Inventors: Kyler Carroll, Cardiff, CA (US); Deidre Strand, San Diego, CA (US); Gang Cheng, San Diego, CA (US); Cameron Peebles, Oceanside, CA (US); Ben Lancia, La Mesa, CA (US); Bin Li, San Diego, CA (US); Alex Freigang, San Diego, CA (US)

(73) Assignee: Wildcat Discovery Technologies, Inc., San Diego, CA (US)

(*) Notice: Subject to any disclaimer, the term of this patent is extended or adjusted under 35 U.S.C. 154(b) by 597 days.

(21) Appl. No.: 17/306,921

(22) Filed: May 3, 2021

(65) Prior Publication Data

US 2021/0253852 A1 Aug. 19, 2021

Related U.S. Application Data

(63) Continuation-in-part of application No. 16/910,643, filed on Jun. 24, 2020, now Pat. No. 11,005,124.
(Continued)

(51) Int. Cl.
*H01M 10/0562* (2010.01)
*C08F 14/22* (2006.01)
(Continued)

(52) U.S. Cl.
CPC .............. *C08L 71/02* (2013.01); *C08F 14/22* (2013.01); *C08G 65/08* (2013.01);
(Continued)

(58) Field of Classification Search
CPC .......... H01M 10/052; H01M 10/0525; H01M 10/056; H01M 10/0562; H01M 10/0565
See application file for complete search history.

(56) References Cited

U.S. PATENT DOCUMENTS

| 4,009,092 A | 2/1977 | Taylor |
| 4,722,877 A | 2/1988 | Sammells |

(Continued)

FOREIGN PATENT DOCUMENTS

| CN | 103985900 A | 8/2014 |
| CN | 104600358 A | 5/2015 |

(Continued)

OTHER PUBLICATIONS

Abouimrane, A. et al., "Solid Electrolyte Based on Succinonitrile and LiBOB Interface Stability and Application in Lithium Batteries", Journal of the Electrochemical Society, 154 (11) A1031-A1034 (2007).

(Continued)

*Primary Examiner* — Osei K Amponsah
(74) *Attorney, Agent, or Firm* — Young Basile Hanlon & MacFarlane, P.C.

(57) ABSTRACT

A composite solid state electrolyte comprises a polymer electrolyte material, a ceramic ion conductor, and a functionalized coupling agent selected to be compatible with the ceramic ion conductor and the bulk polymer compound. The polymer electrolyte material comprises a bulk polymer compound and a lithium salt. The functionalized coupling agent has a backbone that is structurally similar to the bulk polymer compound.

20 Claims, 8 Drawing Sheets

Related U.S. Application Data which is a continuation of application No. 15/639,899, filed on Jun. 30, 2017, now Pat. No. 10,734,676.

(51) Int. Cl.

| | |
|---|---|
| *C08G 65/08* | (2006.01) |
| *C08L 71/02* | (2006.01) |
| *H01M 10/052* | (2010.01) |
| *H01M 10/0525* | (2010.01) |
| *H01M 10/056* | (2010.01) |
| *H01M 10/0565* | (2010.01) |
| *C01D 15/00* | (2006.01) |
| *C01F 17/206* | (2020.01) |
| *C01G 23/00* | (2006.01) |
| *C01G 35/00* | (2006.01) |

(52) U.S. Cl.
CPC ..... *H01M 10/052* (2013.01); *H01M 10/0525* (2013.01); *H01M 10/056* (2013.01); *H01M 10/0562* (2013.01); *H01M 10/0565* (2013.01); *C01D 15/00* (2013.01); *C01F 17/206* (2020.01); *C01G 23/005* (2013.01); *C01G 35/006* (2013.01); *H01M 2300/0065* (2013.01); *H01M 2300/0068* (2013.01); *H01M 2300/0082* (2013.01); *H01M 2300/0091* (2013.01)

(56) References Cited

U.S. PATENT DOCUMENTS

| | | | |
|---|---|---|---|
| 5,300,374 | A | 4/1994 | Agrawal et al. |
| 5,599,355 | A | 2/1997 | Nagasubramanian et al. |
| 6,326,105 | B1 | 12/2001 | Kejha et al. |
| 6,822,065 | B1 | 11/2004 | Sanchez et al. |
| 2002/0197535 | A1 | 12/2002 | Dudley et al. |
| 2003/0094599 | A1 | 5/2003 | Le et al. |
| 2004/0029014 | A1 | 2/2004 | Hwang |
| 2004/0106046 | A1 | 6/2004 | Inda |
| 2005/0132562 | A1 | 6/2005 | Saito et al. |
| 2006/0035148 | A1 | 2/2006 | Balaya et al. |
| 2007/0020527 | A1 | 1/2007 | Ehrismann et al. |
| 2008/0124630 | A1 | 5/2008 | Kim et al. |
| 2008/0220334 | A1 | 9/2008 | Inda |
| 2008/0248396 | A1 | 10/2008 | Jung et al. |
| 2008/0268346 | A1 | 10/2008 | Inda |
| 2008/0292963 | A1 | 11/2008 | Sato et al. |
| 2008/0318133 | A1 | 12/2008 | Matsuyama et al. |
| 2009/0104538 | A1 | 4/2009 | Wakihara et al. |
| 2009/0136830 | A1 | 5/2009 | Gordon |
| 2009/0191462 | A1 | 7/2009 | Matsui et al. |
| 2011/0177398 | A1 | 7/2011 | Affinito et al. |
| 2011/0300432 | A1 | 12/2011 | Snyder et al. |
| 2012/0094186 | A1 | 4/2012 | Chu et al. |
| 2012/0288770 | A1 | 11/2012 | Yokoyama |
| 2013/0026409 | A1 | 1/2013 | Baker et al. |
| 2013/0260207 | A1 | 10/2013 | Uemura |
| 2013/0273437 | A1 | 10/2013 | Yoshioka et al. |
| 2013/0309570 | A1 | 11/2013 | Kim et al. |
| 2014/0134483 | A1 | 5/2014 | Ouchi et al. |
| 2014/0170504 | A1 | 6/2014 | Baek et al. |
| 2014/0308570 | A1 | 10/2014 | Gaben et al. |
| 2014/0308576 | A1 | 10/2014 | Gaben et al. |
| 2014/0370398 | A1 | 12/2014 | Lee et al. |
| 2015/0171463 | A1 | 6/2015 | Liang et al. |
| 2015/0188187 | A1 | 7/2015 | Strand et al. |
| 2017/0047581 | A1 | 2/2017 | Lu et al. |
| 2017/0077547 | A1 | 3/2017 | Takami et al. |
| 2017/0309914 | A1 | 10/2017 | Drews et al. |

FOREIGN PATENT DOCUMENTS

| | | |
|---|---|---|
| EP | 1424746 A1 | 6/2004 |
| JP | 1999031415 | 2/1999 |
| JP | 2006086102 A | 3/2006 |
| JP | 2011108499 A | 6/2011 |
| JP | 2015079702 A | 4/2015 |
| WO | 1997049106 A1 | 12/1997 |

OTHER PUBLICATIONS

Croce, F., et al., "Nanocomposite, PEO-LiBOB Polymer Electrolytes for Low Temperature, Lithium Rechargeable Batteries", Journal of New Materials for Electrochemical Systems 9, 3-9 (2006).

Egashira, Minato, et al., "Effects of the Surface Treatment of the A 1203 Filler on the Lithium Electrode/Solid Polymer Electrolyte Interface Properties", Electrochemica Acta 52 (2006) 1082-1086.

Extended European Search Report in corresponding EP Application No. 17821393.0 dated Nov. 13, 2019 (6 pages).

Inada, Ryoji, et al., "Synthesis and properties of Al-free Li7-xla3Zr2-xTaxO12 garnet related oxides", Solid State Ionics, 262 (2014) 568-5723.

International Search Report & Written Opinion dated Dec. 7, 2017 in International application No. PCT/US2017/040391.

International Search Report & Written Opinion dated Oct. 11, 2017 in International application No. PCT/US2017/040374.

International Search Report & Written Opinion dated Mar. 5, 2018 in International application No. PCT/US2017/062845.

Office Action in corresponding JP Application No. 2018-568274 dated Feb. 4, 2020 (8 pages).

Sumathipala, H. H., et al., "High Performance PEO-based Polymer Electrolytes and their Application in Rechargeable Lithium Polymer Batteries", Ionics (2007) 13:281-286.

Wang, Congxiao, et al., "All Solid-State Li/LixMnO2 Polymer Battery Using Ceramic Modified Polymer Electrolytes", Journal of the Electrochemical Society, 149 (8) A967-A972 (2002).

Winand, Jean-Marc et al., "Nouvelles Solutions Solides Li (MIV) 2-x (NIV)x(PO 4)3 (L=Li, Na M, N=GE, Sn, Ti, Zr, Hf) Synthese et Elude par Diffraction x et Conductivite Ionique", Journal of Solid State Chemistry, 93, 1991, pp. 341-349.

Zhang, Ding, et al., "Electrochemical Stability of Lithium bis(oxallato) borate Containing Solid Polymer Electrolyte for Lithium Ion Batteries", Journal of Power Sources 196 (2011) 10120-10125.

210

| Chemical Name | Code | Function | Structure |
|---|---|---|---|
| N-(acid-PEG3)-N-bis(PEG3-amine) | A | Bi-Dendate | |
| Amino-Tri-(carboxyethoxymethyl)-methane | B | Tri-Dendate | |
| Propargyl-PEG10-amine | C | Propargyl | |
| 1,1,1-Trifluoromethyl-PEG4-amine | D | Trifluoroethyl | |
| Amino-PEG3-CH2CO2-t-butyl ester | E | T-Butyl Ester | |
| Amino-PEG10-alcohol | F | Alcohol | |
| Amino-PEG10-amine | G | Bis-Amine | |
| Aminooxy-PEG8-acid | H | Activated Amino | |
| Azido-PEG10-acid | I | Azido | |
| Bis-PEG10-acid | J | Bis-acid | |
| Fmoc-N-amido-PEG10-acid | K | Protected Amino | |
| Hydroxy-PEG10-acid | L | Hydroxy | |
| Methyltetrazine-PEG4-acid | M | Methyltetrazine | |

| Chemical Name | Code | Function | Structure |
|---|---|---|---|
| Perfluoro-3,7-dimethyloctanoic acid | A | Acid | |
| 2-(4,4,5,5,6,6,6-Heptafluorohexyl)malonic acid | B | Bis-Acid | |
| Difluoromalonic acid | C | Bis-Acid | |
| Perfluoro(2,5-dimethyl-3,6-dioxanonanoic acid) | D | EO Acid | |
| Dodecafluorosuberic acid | E | Bis-Acid | |
| Hexafluoroglutaric acid | F | Bis-Acid | |
| 2,2,3,3,4,4,5,5-Octafluoro-1,6-hexyl diacrylate | G | Acrylate | |
| 2,2,3,4,4,4-Hexafluorobutyl acrylate | H | Acrylate | |
| 1H,1H,2H,2H-Heptadecafluorodecyl methacrylate | I | Acrylate | |
| Heptafluorobutyramidine | J | Amide | |
| 1H,1H-Pentadecafluorooctylamine | K | Amine | |
| 2,2,3,3,4,4,5,5,6,6,7,7-Dodecafluoro-1,8-octanediol | L | Alcohol | |
| 1H,1H,11H-Eicosafluoro-1-undecanol | M | Alcohol | |
| 1,8-octanediol | N | Non-Fluorinated alcohol | |

FIG. 11

COMPOSITE SOLID STATE ELECTROLYTE AND LITHIUM ION BATTERY CONTAINING THE SAME

CROSS-REFERENCE TO RELATED APPLICATIONS

This application is a continuation-in-part of U.S. application Ser. No. 16/910,643, entitled Solid Electrolyte Compositions and filed 24 Jun. 2020, which is a continuation of U.S. application Ser. No. 15/639,899, filed 30 Jun. 2017, now issued as U.S. Pat. No. 10,734,676. Each of these two applications is incorporated by reference herein in its entirety.

GOVERNMENT LICENSE RIGHTS

This invention was made with government support under DE-EE0008853 awarded by the U.S. Department of Energy. The government has certain rights in the invention.

BACKGROUND

The present invention is in the field of battery technology, and, more particularly, in the area of solid materials and composite materials for use as electrolytes in solid state battery cells.

Conventional lithium ion batteries include a positive electrode, or cathode, a negative electrode, or anode, an electrolyte, and typically a separator. The electrolyte conventionally includes a liquid component that facilitates lithium ion transport, such as to enable lithium ion penetration into the active materials of the electrodes. In contrast, solid state lithium ion batteries lack liquid components in the final manufactured product. The electrolytes in such solid state battery cells do not include a liquid phase. Solid state battery cells may be less flammable and volatile than batteries that contain liquid electrolytes, and may offer a wider range of packaging options because a liquid-tight seal is not necessary. Another advantage of solid state battery cells may be increased energy density per unit cell because solid electrolytes can enable the use of high capacity lithium metal anodes.

Solid state cells have not yet achieved widespread adoption because of practical limitations. One drawback is high impedance due to poor lithium transport through solids and across solid-solid interfaces. Solid state cells tend to have a substantial amount or degree of interfaces among different solid components of the battery. Interfaces can occur within the electrodes themselves, within the solid state electrolyte, and between the electrodes and the electrolyte. The magnitude or extent of such interfaces, as well as the impedance at each interface, can limit lithium ion transport and impede battery performance. Poor lithium ion transport across these interfaces results in high impedance in battery cells and low capacity on charge and discharge.

It may be desirable to have a solid state electrolyte that demonstrates lower interfacial impedance to provide better lithium transport in solid state battery cells.

SUMMARY

In one or more embodiments, a composite solid state electrolyte is provided that comprises a polymer electrolyte material, a ceramic ion conductor, and a functionalized coupling agent selected to be compatible with the ceramic ion conductor and the bulk polymer compound. The polymer electrolyte material comprises a bulk polymer compound and a lithium salt. The functionalized coupling agent has a backbone that is structurally similar to the bulk polymer compound.

In one or more embodiments, a lithium ion battery is provided that comprises a cathode capable of reversible intercalation of lithium ions, an anode, and a composite solid state electrolyte. The composite solid state electrolyte comprises a polymer electrolyte material, a ceramic ion conductor, and a functionalized coupling agent selected to be compatible with the ceramic ion conductor and the bulk polymer compound. The polymer electrolyte material comprises a bulk polymer compound and a lithium salt. The functionalized coupling agent has a backbone that is structurally similar to the bulk polymer compound.

In one or more embodiments, a composite solid state electrolyte is provided that comprises a polymer electrolyte material, lithium aluminum titanium phosphate (LATP) as a ceramic ion conductor, and a functionalized coupling agent. The polymer electrolyte material comprises a bulk polymer compound and lithium triflate salt. The bulk polymer compound comprises polyethylene oxide (PEO) or polyvinylidene difluoride (PVDF). The functionalized coupling agent is selected to be compatible with the ceramic ion conductor and the bulk polymer compound. The functionalized coupling agent has a backbone that comprises polyethylene glycol (PEG) when the bulk polymer compound comprises PEO, and the backbone comprises a perfluorinated alkyl when the bulk polymer compound comprises PVDF.

BRIEF DESCRIPTION OF THE DRAWINGS

FIG. 6 is a table showing the chemical name, letter identifier associated with FIG. 5, functional group class, and chemical structure for each of the functionalized coupling agents of the tested trilayer cells.

FIG. 11 is a table showing the chemical name, letter identifier associated with FIG. 10, functional group class of at least one end unit, and chemical structure for each of the functionalized coupling agents of the tested trilayer cells in FIG. 10.

DETAILED DESCRIPTION

Figures 1A, 1B:
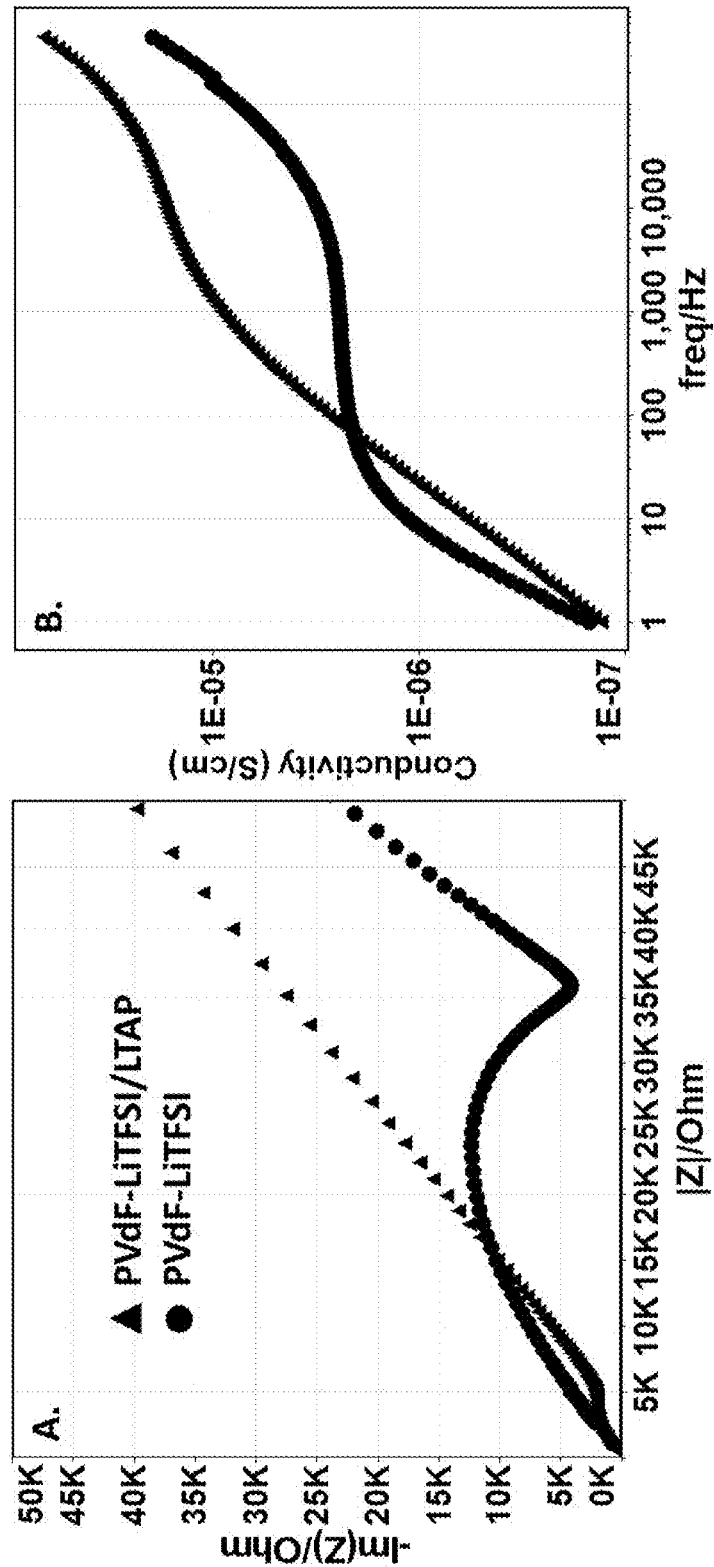
FIG. 1A illustrates the results of electrochemical testing of solid electrolyte formulations according to certain embodiments of the present disclosure.
FIG. 1B illustrates the results of electrochemical testing of solid electrolyte formulations according to certain embodiments of the present disclosure.

The following definitions apply to aspects described with respect to one or more embodiments of the inventive subject matter. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The term "solid state electrolyte" as used herein is used primarily to distinguish from electrolyte formulations where the formulation is an entirely liquid phase, almost entirely liquid phase, or substantially liquid phase. In at least one embodiment, the solid state electrolyte is devoid of the liquid phase in the final, manufactured product that is applied to a lithium ion battery cell. For example, although one or more components may be in the liquid phase during the manufacturing process, various drying and/or heating steps may be applied to evaporate and/or solidify such components prior to achieving the final product that is applied to the battery cell.

The term "polymer" as used herein refers generally to a molecule whose structure is composed of multiple repeating units, and encompasses classes of polymers such as oligomers. The structures of the polymers described herein can be linear or branched. The term includes co-polymers of all types. As with other applications using polymeric materials, the properties of the polymeric material can be influenced by (i) the choice of polymer, (ii) the molecular weight of the polymer, (iii) the polydispersity of the polymer, (iv) the processing conditions, and (v) the presence of additives. While combinations of these factors are generally known, it is not necessarily predictable how these various factors will interact in a given application.

To the extent certain battery characteristics can vary with temperature, such characteristics are specified at 30 degrees C., unless the context clearly dictates otherwise.

Ranges presented herein are inclusive of their endpoints. Thus, for example, the range 1 to 3 includes the values 1 and 3 as well as the intermediate values between the endpoints.

Embodiments of the inventive subject matter provide composite solid state electrolytes, lithium ion secondary battery cells that include such composite solid state electrolytes, and methods of preparing such composite solid state electrolytes and lithium ion secondary battery cells.

The composite solid state electrolytes disclosed herein include a ceramic ion conductor (e.g., ceramic ion-conducting compound), a polymer electrolyte material, and a coupling agent. The combination of the ceramic, the polymer electrolyte, and the coupling agent form a composite solid-state electrolyte material. The coupling agents according to the embodiments described herein were experimentally tested and determined to lower the interfacial impedance between the ceramic and the polymer electrolyte. The composite solid state electrolytes can be used as a separator between the anode and the cathode in a lithium ion battery cell.

Composite ceramic and polymer electrolytes combine the beneficial properties of ceramics with the beneficial properties of polymers. For example, ceramics generally are mechanically strong and have high ionic conductivity. Polymers generally have good processability which enables commercial manufacturing at relatively low cost and high volume. The composite ceramic and polymer electrolyte generally retains these advantageous properties, but suffers from high interfacial impedance between the two phases, which reduces the ionic conductivity of the solid state electrolyte. For example, due to the interfacial impedance, the ion transport pathway typically is through the polymer, which intrinsically has poor ionic conductivity, rather than through the ceramic that has better conductivity. Incorporating the coupling agent into the solid state electrolyte, according to the embodiments described herein, reduces the interfacial impedance between the ceramic and the polymer phases, which increases ionic conductivity by increasing ion transport across interfaces and through the ceramic.

In some embodiments, the polymer electrolyte material comprises poly(ethylene oxide) ("PEO"). PEO is a commodity polymer available in a variety of molecular weights. PEO can range from very short oligomers of about 300 g/mol (or 300 Da) to very high molecular weights of 10,000,000 g/mol (or 10,000 kDa). At molecular weights of 20 kDa and below, PEO is typically referred to as poly (ethylene glycol) or PEG. PEO has been used as a separator in conventional liquid electrolyte systems and, as described above, as a component in a thin-film solid-state electrolyte. The use of PEO as a separator in conventional liquid electrolyte systems is technically distinct from the solid state electrolyte use described herein, and such use in separators is not predictive of the results achieved by certain of the embodiments disclosed herein.

PEO processed into multiple structures, whether intended for a solid-state electrolyte or not, can have both crystalline and amorphous domains. Ionic conductivity happens more readily in the amorphous domains and, therefore, processing conditions that decrease crystalline domain size and/or the overall amount of crystallinity are preferred for uses of PEO that include solid-state electrolyte formulations. Some research has used carbonate solvents, such as ethylene carbonate, dimethyl carbonate, or diethyl carbonate, as plasticizers to improve ionic transport and reduce interfacial impedance. However, this involves the addition of a volatile, flammable solvent to the battery and negates many of the safety benefits brought by a solid-state electrolyte. In PEO systems, PEG can be added to achieve the desired processing properties, such as a preferred solution viscosity, film modulus, or film glass transition temperature.

While PEO is discussed herein as a possible polymeric material for use in the solid-state electrolyte, it is understood that other polymers with equivalent chemical, electrochemical, mechanical, and/or thermal properties can be used in place of or in addition to PEO and/or PEO/PEG mixtures. Further, copolymers that include PEO, PEG, or PEO-like polymers in at least one segment of the copolymer can be suitable for certain embodiments described herein. Thus, the embodiments described herein that refer to PEO or PEO/ PEG are understood to encompass other such polymeric and co-polymeric materials. Further, the embodiments described herein that refer to PEO or PEO/PEG are understood to encompass routine chemical modifications to the chemical structure of the PEO or PEO/PEG, where such routine chemical modifications do not substantially alter the structure, conductivity, and/or utility of the PEO or PEO/PEG.

PEO and PEG can be represented as structure (a):

(a)

where n indicates the number of repeat units in the polymer chain and is greater than 1. PEO and PEG can be referred to as an "ethylene oxide" polymer. And the variations of PEO and PEG can be represented as structure (b):

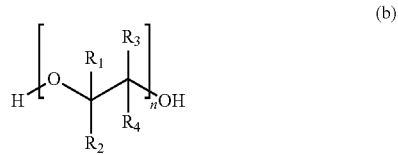

(b)

where $R_1$, $R_2$, $R_3$, and $R_4$ represent examples of the site of substitution that may be considered within the scope of the embodiments disclosed herein. Routine substitutions of groups include, but are not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions. Thus, "ethylene" oxide polymers embrace PEO, PEO/PEG, and the various modifications contemplated herein.

Certain embodiments employ polyvinylidene fluoride (also known as polyvinylidene difluoride) (PVDF) as the polymer, which has significantly better voltage stability than the commonly used polyethylene-oxide-based solid-state electrolytes.

PVDF is a commodity polymer available in a variety of molecular weights, including molecular weights of 10,000,000 g/mol (or 10,000 kDa). PVDF has been used as a binder in conventional electrodes. The use of PVDF as a binder in conventional electrodes is technically distinct from the use described herein, and such use in electrodes is not predictive of the results achieved by certain of the embodiments disclosed herein.

PVDF can be processed into multiple structures, whether intended for a solid-state electrolyte or not. While PVDF is discussed herein as a possible polymeric material for use in the solid-state electrolyte, it is understood that other polymers with equivalent chemical, electrochemical, mechanical, and/or thermal properties can be used in place of or in addition to PVDF. Further, copolymers that include PVDF or PVDF-like polymers in at least one segment of the copolymer can be suitable for certain embodiments described herein. Thus, the embodiments described herein that refer to PVDF are understood to encompass other such polymeric and co-polymeric materials. Further, the embodiments described herein that refer to PVDF are understood to encompass routine chemical modifications to the chemical structure of the PVDF, where such routine chemical modifications do not substantially alter the structure, conductivity, and/or utility of the PVDF.

PVDF can be represented as structure (c):

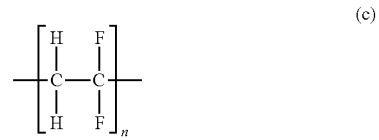

(c)

where n indicates the number of repeat units in the polymer chain and is greater than 1. And the variations of PVDF can be represented as structure (d):

(d)

where $R_1$ and $R_2$ represent examples of the site of substitution that may be considered within the scope of the embodiments disclosed herein. Routine substitutions of groups include, but are not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions.

The solid state electrolyte includes an inorganic ceramic ion conductor (e.g., ion-conducting material). A preferred example of the ceramic ion conductor is lithium aluminum titanium phosphate (LATP). Examples of LATP can have chemical formula $Li_{1.3}Al_{0.3}Ti_{1.7}(PO_4)_3$ or $Li_{1.4}Al_{0.4}Ti_{1.6}(PO_4)_3$. Generally speaking, inorganic phosphates including one or more transition metals and one or more alkali metals are a preferred class of ion-conducting inorganic material. Inorganic phosphates provide a good blend of conductivity, stability, processability and ease of synthesis. However, the ceramic ion conductor could also be other types of inorganic compounds, such as $Li_{6.5}La_3Zr_{1.5}Ta_{0.5}O_{12}$ ("LLZTO"), $Li_{10}SnP_2S_{12}$ ("LSPS"), $P_2S_5$—$Li_2S$ glass, $Li_{1-x+y}Al_xTi_{2-x}Si_yP_{3-y}O_{12}$, or $Li_2PO_2N$ ("LiPON").

The lithium salts used to create the improved solid-state electrolytes disclosed herein include, but are not limited to, lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), Lithium bis(fluorosulfonyl)imide (LiFSI), and lithium triflate ($LiCF_3SO_3$). Preferably, lithium bis(trifluoromethanesulfonyl)imide is used in the solid-state electrolyte formulations.

One potential drawback for inorganic materials in a composite with polymer materials is that impedance can occur at the interfaces between the two types of materials. The materials can experience poor surface contact at their interfaces, which results in poor ionic conduction across these interfaces. The poor contact is typically the result of the mismatch in mechanical properties of each material, and can be exacerbated by chemical or electrochemical incompatibility between the two materials.

In order for the lithium conduction path to occur primarily in the inorganic phase, several conditions should be met. First, the interfacial impedance between the polymer and the inorganic particle should be low enough such that the energy required for lithium ions to cross the interface is less than the energy required to move through the polymer. Second, the polymer matrix should substantially wet and adhere to the inorganic during repeated cycling. If the organic materials are in particle form, particle-to-particle lithium-ion transport is difficult over large gaps in an unsintered material. In the embodiments disclosed herein, there may not be a sintering step. Thus, the inorganic materials should be well dispersed throughout the polymer to help minimize particle-to-particle distances.

According to certain embodiments disclosed herein, the potential for interfacial impedance in the composites can be mitigated through the use of chemical linking agents or chemical coupling agents. The coupling agents can aid in the dispersing, wetting, adhesion, and/or covalent bonding between the polymer and the inorganic material. The identity of the coupling agent can vary with the chemical nature of the polymer and the inorganic material. Typically, the coupling agent will have a first chemical group that is chemically compatible with the polymer and a second chemical group that is chemically compatible with the inorganic material. A spacing group can also be present in the coupling agent to space apart the first and second chemical groups to allow them to interact with their respective target materials unhindered. The spacing group can include carbonate-type structures similar to the liquid electrolytes known to be compatible with the electrolyte salts and other materials in use in conventional lithium ion batteries. Further, the coupling agents can facilitate agglomeration of inorganic particles to prevent the polymer from penetrating between the adhered particles and creating undesirably large conduction gaps.

The coupling agents can be considered to be molecular tethers that bond the inorganic material to the polymer. The bonding may be covalent, ionic, or other bonding. Coupling agents can ensure improved adhesion by chemically bonding the polymer to the inorganic particles. As described above, the coupling agents can consist of molecules with reactive groups on both ends, which are used to covalently link the two different materials. The coupling agents can provide a way to enhance the conductivity at the interface between the polymer and inorganic material.

Figure 2:
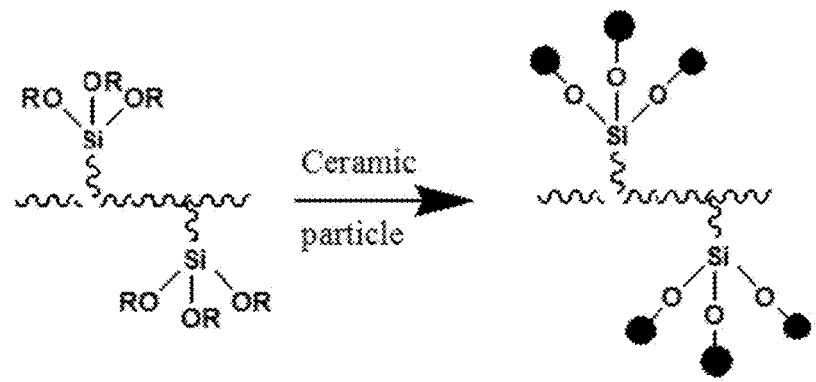
FIG. 2 illustrates a schematic for a synthetic route for forming a solid-state electrolyte according to certain embodiments of the present disclosure.
Figure 3:
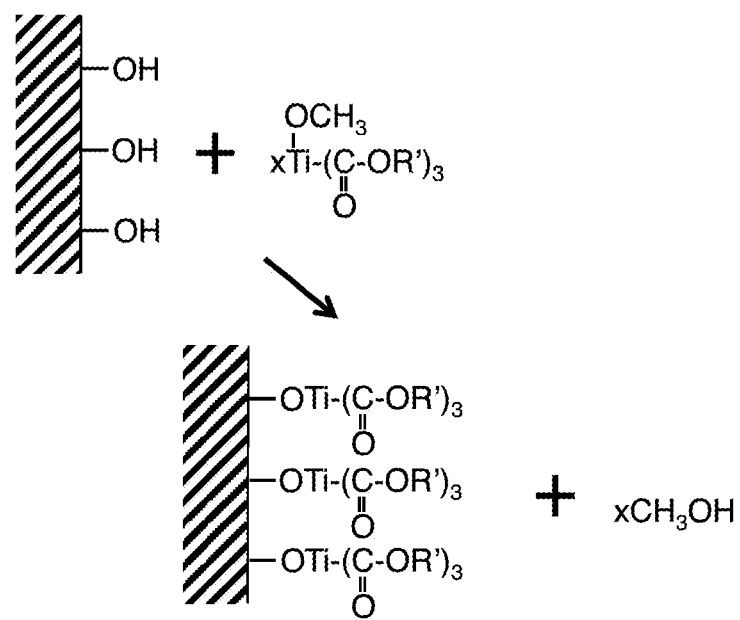
FIG. 3 illustrates a schematic for another synthetic route for forming a solid-state electrolyte according to certain embodiments of the present disclosure.

Examples of coupling agents according to certain embodiments are shown in FIGS. 2 and 3. FIG. 2 illustrates the reaction of a silicon containing coupling agent with a ceramic particle, in which the $—Si(OR)_3$ groups react with functionalities on the ceramic surface to create silicon oxygen linkages to the particles. More generally, the coupling agent can have a structure such as $R—(CH_2)_n—Si—X_3$, where n is 1 or more and X is a hydrolysable group such as an alkoxy, acyloxy, amine, or halogen designed to react with the inorganic phase. In general, trifunctional agents are most preferred due to greater stability on surfaces. The bridging group $(CH_2)_n$ can vary in length and facilitates the interaction of the R group with the polymer.

In such embodiments, R includes, but is not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions. The R groups is chosen to have a moiety capable of reacting with the polymer. In some preferred embodiments, R includes a carbonate.

Organometallic species such as silanes, titanates, zirconates, and aluminates can be used as coupling agents. FIG. 3 illustrates the use of a titanate coupling agent with an ester structure at the interface. That is, the exposed hydroxyls on the inorganic particle are reacted with the Ti—OR group to form titanium oxygen linkages to the surface. One preferred coupling agent is 3-(trimethoxysilyl)propyl methacrylate.

Covalently bonded linkages could include silicon oxygen linkages, titanium oxygen linkages, etc. from reaction of M-O—R groups (where M is a metal, O is oxygen, and R is an organic functional groups such as the R groups identified above) to form metal oxygen bonds to elements on the particle surface. Other linkages could include hydrogen bonds, ionic bonds, dipole-dipole interactions, surfactant type-interactions, or solubility (e.g., a polymer linkage from the particle surface dissolved within the polymer matrix).

According to certain embodiments disclosed herein, the potential for interfacial impedance in the composites can be mitigated through the use of additives such as salts. As with the coupling agents, the identity of the salt can depend on the identity of the polymer and inorganic material, with salts chosen to be chemically compatible with each material. The salts can aid in the dispersing, wetting, adhesion, and/or covalent bonding between the polymer and the inorganic material.

Surface treatment of the inorganic phase may be required prior to the use of coupling agents. Suitable surface treatments include ionizing treatments, chemical etching, plasma treatments, and other forms of surface modification.

According to certain embodiments, the components of the electrolyte formulations can be combined in various weight percent ratios, where the weight percent refers to the percent of a component as compared to the total weight of the formulation. For example, the polymer can be present in the electrolyte formulation at a weight percent of from about 2% to about 15%, the inorganic ion conductor can be present in the electrolyte formulation at a weight percent of from about 40% to about 95%, the lithium salt can be present in the electrolyte formulation at a weight percent of from about 5% to about 35%, the coupling agent can be present in the electrolyte formulation at a weight percent of from about 0% to about 10%, and the other additives can be present in the electrolyte formulation at a weight percent of from about 0% to about 20%.

The polymer can be present in the electrolyte formulation at a weight percent of about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %. The inorganic ion conductor can be present in the electrolyte formulation at a weight percent of about 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %. The lithium salt can be present in the electrolyte formulation at a weight percent of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %. The coupling agent can be present in the electrolyte formulation at a weight percent of about 0 wt %, 1 wt %, 2 wt %, 3 wt %, 4 wt %, 5 wt %, 6 wt %, 7 wt %, 8 wt %, 9 wt %, or 10 wt %. The other additives can be present in the electrolyte formulation at a weight percent of about 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

The solid-state batteries formed using the solid electrolyte formulations disclosed herein can be used with electrode configurations and materials known for use in solid-state batteries. The active material for use in the cathode can be any active material or materials useful in a lithium ion battery cathode, including the active materials in lithium metal oxides or layered oxides (e.g., $Li(NiMnCo)O_2$), lithium-rich layered oxide compounds, lithium metal oxide spinel materials (e.g., $LiMn_2O_4$, $LiNi_{0.5}Mn_{1.5}O_4$), olivines (e.g., $LiFePO_4$, etc.). Preferred cathode active materials include lithium cobalt oxide (e.g., $LiCoO_2$) and lithium layered oxides (e.g., $Li(NiMnCo)O_2$. Active materials can also include compounds such as silver vanadium oxide (SVO), metal fluorides (e.g., $CuF_2$, $FeF_3$), and carbon fluoride ($CF_x$). The finished cathode can include a binder material, such as poly(tetrafluoroethylene) (PTFE) or PVDF. More generally, the active materials for cathodes can include phosphates, fluorophosphates, fluorosulfates, silicates, spinels, and composite layered oxides. The materials for use in the anode can be any material or materials useful in a lithium ion battery anode, including lithium-based, silicon-based, titanium based oxides and carbon-based anodes.

The following examples describe specific aspects of some embodiments of the inventive subject matter to illustrate and provide a description for those of ordinary skill in the art. The examples should not be construed as limiting the inventive subject matter, as the examples merely provide specific methodology useful in understanding and practicing some embodiments of the inventive subject matter.

Preparation of solid-state electrolyte films. Electrolytes were fabricated using a multi-step process. A lithium salt, such as LiTFSI, and a polymer, such as PVDF, were dissolved in a liquid solvent, such as n-methyl-2-pyrrolidone (NMP). The resulting solution was combined with an inorganic material, such as LATP, and mixed for a period of at least six hours, but typically overnight. The resulting slurry was cast on a sheet of Teflon using a doctor blade to produce a film that was from about 61 to about 84 weight percent LATP, 9 weight percent PVDF, and from about 7 to about 30 weight percent LiTFSI. The resulting film was dried at 150 degrees Celsius for several hours until ready for processing. The solid-state electrolyte film was cut to desired geometries and pressed at 3 ton/cm' prior to cell build. The typical solid-state electrolyte film thickness was between about 15 and 20 microns.

Cell Assembly. Test cells were formed in a high-purity argon-filled glove box (M-Braun, $O_2$ and humidity content <0.1 ppm). The two electrodes were stainless steel. The electrolyte layers were placed between the stainless steel electrodes to assemble the cell stack. After assembly, the cell stack was annealed at from about 70 to about 110 degrees Celsius for about 2 hours with stack pressure maintained at a fixed amount. The cell was sealed and characterized.

Cell Characterization. Electrochemical impedance spectroscopy (EIS) is used to determine the ionic conductivity of the solid-state electrolyte films. A film with known thickness and area is placed between two polished stainless steel (SS) disks, and an AC voltage (10 mV) is applied at varying frequencies. The resulting amplitude change and phase shift in the response is used to calculate ionic conductivity of the film. Herein, the cells were tested over a frequency range from 1 Hz to 1 MHz.

FIGS. 1A and 1B illustrate the results of electrochemical testing of solid electrolyte formulations according to certain embodiments of the present disclosure. FIG. 1A illustrates a Nyquist plot, which shows the frequency response of the impedance of the cell and directly relates to the conductivity plot in FIG. 1B. FIG. 1B illustrates the conductivity of the test cells as a function of frequency. In each figure, the solid circles represent a solid-state electrolyte formed from PVDF and LiTFSI, and the solid triangles represent a solid-state electrolyte formed from PVDF, LiTFSI, and LATP. Taken together, FIGS. 1A and 1B show that the solid-state electrolyte having a polymer/inorganic formulation (PVDF, LiTFSI, and LATP) has improved conductivity as compared to the solid-state electrolyte having a polymer formulation (PVDF and LiTFSI).

The comparison between the polymer/inorganic formulation and the polymer formulation leads to the conclusion that lithium ion conduction is being driven through the inorganic component. That is, the polymer component is not a strong lithium ion conductor, while the inorganic component is a lithium ion conductor. Thus, the improvement in conductivity is likely due to the inorganic component, while the polymer component provides improved mechanical properties.

In one or more embodiments, a composite solid state electrolyte is provided that includes a polymer electrolyte material, a ceramic ion conductor, and a functionalized coupling agent. The polymer electrolyte material includes a bulk polymer compound and a lithium salt. The functionalized coupling agent is compatible with the ceramic ion conductor and the bulk polymer compound.

In an embodiment, the ceramic ion conductor of the composite solid state electrolyte can include or represent LATP. The LATP may be in the form of pellets or powder Various other types of ceramic ion conductors can be used in other embodiments, such as lithium lanthanum zirconium oxide (LLZO), sulfide materials, and the like. LLZO has chemical formula $Li_7La_3Zr_2O_{12}$. Sulfide materials may include $Li_{10}Ge_3P_2S_{12}$, $Li_7P_3S_{11}$, and/or the like.

The polymer electrolyte material includes a bulk polymer compound and a lithium salt. The bulk polymer compound may include or represent long chain polymers, such as PEO, PVDF, hexafluoropropylene (HFP), polypropylene carbonate (PPC), polyphenylene sulfide (PPS), polyanhydrides, polyacrylonitrile (PAN), and/or the like. The bulk polymer may be a copolymer of multiple bonded monomers. The lithium salt in the polymer electrolyte material can include, but is not limited to, lithium triflate ($LiCF_3SO_3$), LiTFSI, $LiBF_4$, $LiAsF_6$, LiBOB, $LiClO_4$, $LiPF_6$, LiFSI, and/or lithium 4,5-dicyano-2-(trifluoromethyl)imidazole (LiTDI). In a first non-limiting example, the bulk polymer compound is or includes PEO, the lithium salt is or includes lithium triflate, and the coupling agent includes a PEG backbone. In a second non-limiting example, the bulk polymer compound is or includes PVDF, the lithium salt is or includes lithium triflate, and the backbone of the coupling agent includes a per fluorinated alkyl chain.

In the composite solid state electrolyte, the coupling agent is anchored between the ceramic and the polymer electrolyte material to provide localized lithium transport between the ceramic and the polymer electrolyte material. The coupling agent is selected and/or designed to reduce the interfacial resistance between the ceramic ion conductor and the polymer electrolyte material. The coupling agent can be a functionalized small molecule, oligomer, or polymer material. For example, a generic structure of the coupling agent includes a repeating unit backbone (n≥1) and at least one end unit at one or more ends of the backbone. The coupling agent according to one or more embodiments has the structure shown in formula (e):

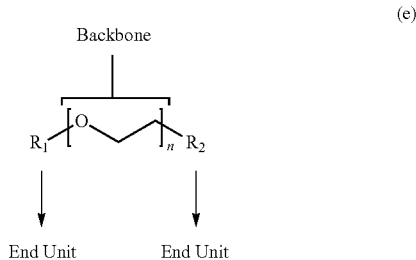

The backbone could be either single, oligomeric, or polymeric repeat units of organic moiety. The repeat unit backbone should be structurally like (e.g., compatible with) the bulk polymeric compounds used in the polymer electrolyte material. For example, if PEO is the bulk polymer compound in the electrolyte, the backbone of the coupling agent should contain an ethylene oxide moiety to be compatible with the PEO. The backbone in formula (e) has an ethylene oxide moiety, which is present in PEG and PEO. In another example, if PVDF is the bulk polymer compound, the backbone of coupling agent should contain partial fluorinated or perfluorinated alkyl chains to be compatible with the PVDF. In a non-limiting example, the molecular backbone of a coupling agent may be considered to be compatible with a bulk polymer if the molecular backbone is structurally similar to the molecular structure of the backbone of the bulk polymer. For example, the backbone of the coupling agent may match a portion of the bulk polymer backbone, meaning that the two backbones have common elements in a common sequence, such as a string of carbon-fluoride (C—F) bonds.

The end units (e.g., $R_1$, $R_2$) include functional group(s) that can preferentially interact with surface functional groups of the ceramic ion conductor and/or the polymer electrolyte material via either molecular interactions or chemical bonding. The end units of the coupling agent may be selected for compatibility with the ceramic ion conductor and/or the polymer electrolyte material (e.g., bulk polymer). For example, if the ceramic surface has a first functional group (e.g., hydroxyl, metal-oxygen-metal bonds, or the like), the coupling agent is selected or formed to have a functional group at an end unit that is compatible with the first functional group. As used herein, two molecular groups or compounds are considered to be compatible with each other if the two groups or compounds interact with one another, either chemically, electrically, and/or physically, to experience retention and/or attraction forces that resist the separation of the molecules or compounds from one another. For example, the two groups or compounds may react with each other to form a covalent or ionic bond, may experience attractive intermolecular forces (e.g., hydrogen bonding, dipole forces, van der Waals forces), may react via other non-covalent bonding mechanisms, and/or the like.

The coupling agent according to the embodiments described herein is selected or formed to be compatible with the polymer electrolyte material. For example, an end unit of the coupling agent may have a functional group that is compatible with a surface functional group of the bulk polymer compound of the polymer electrolyte material, such that the end unit covalently bonds to the surface functional group. In another example, the backbone of the coupling agent may interact with the backbone of the bulk polymer compound through physical miscibility and/or entanglement, which provides retention to resist separation between the compounds. Optionally, the coupling agent backbone may entangle with the bulk polymer chains and the functional end units of the coupling agent may bond with the surface functional groups of the polymer electrolyte material and/or the ceramic ion-conductor, which embeds the coupling agent at the interfaces between the polymer electrolyte material and the ceramic ion-conductor.

With this structural design, the coupling agents can effectively bridge the gap between the polymer electrolyte and the ceramic thanks to the multi-dimensional molecular/chemical and physical interactions that occur at the interface. The coupling agent can provide localized ion transport across molecular interfaces to enable ions to travel through the ionically conductive ceramic material. As a result, the interfacial resistance and/or impedance of the composite solid state electrolyte may be significantly reduced relative to omitting the coupling agent or using a coupling agent that is not compatible with the ceramic and/or the polymer electrolyte material.

In formula (e), the coupling agent is a functionalized PEG compound such that the repeat unit backbone has chemical formula $—OC_2H_4$. PEG is a shorter chain version of PEO. The $—OC_2H_4$ unit may be present at least once, such that n is at least 1 (n≥1). In one or more embodiments, the backbone unit repeats at least once, such that n is at least 2. PEG may be selected as the backbone of the coupling agent when the bulk polymer in the electrolyte material is PEO or polymers similar to PEO (e.g., PEO-type polymers). Although the backbone in formula (e) is shown as PEG, the backbone can have other molecular compositions in other embodiments. For example, the backbone can have the molecular structure of PVDF, as shown in formula (c) and more generically in formula (d).

The end units $R_1$ and $R_2$ are functional groups bonded to opposite ends of the backbone. $R_1$ and $R_2$ may represent the same functional group or two different functional groups. Non-limiting examples of functional groups that may independently represent $R_1$ and $R_2$ include nitrogen-containing groups, hydroxyl groups (—OH), carboxyl (or carboxylic) groups (—COOH), T-butyl ester (—$C_4H_{12}$), propargyl groups (—$CH_2$≡CCH), alcohol groups (—ROH), dentate groups, acrylates (—$CH_2$=CHCOOH), trifluoroethyl groups (—$CH_2CF_3$), and the like. The nitrogen-containing groups may include protected amino groups, unprotected or activated amino groups (—$NH_2$), azido groups (—N=N=N), amidine groups, and amine groups. The protected amino groups are amino groups bonded to a protecting group, such as a carbamate (e.g., —NH-protecting group). The protecting group may be benzyl carbamate (Cbz or Z), 9-Fluorenylmethyl carbamate (Fmoc), t-Butyl carbamate (Boc), and/or the like.

The interfacial impedance was experimentally tested by constructing a trilayer test cell or vehicle which included a ceramic layer sandwiched between two polymer layers. Various candidate coupling agents were incorporated into the ceramic layer, one per experiment, to measure the impedance between the layers.

Figure 4:
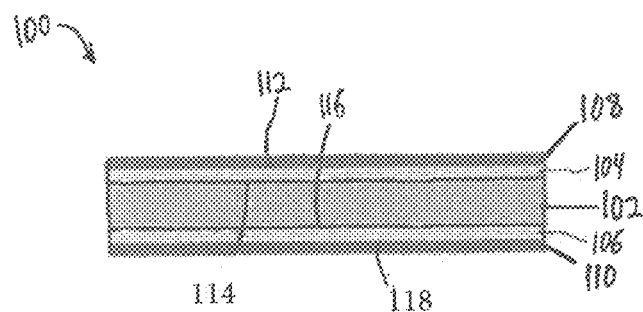
FIG. 4 illustrates a trilayer test cell for experimentally testing interfacial impedance between a ceramic ion-conductor and a polymer electrolyte material according to an embodiment.

FIG. 4 illustrates a trilayer test cell 100 for experimentally testing interfacial impedance between a ceramic ion conductor and a polymer electrolyte material according to an embodiment. The trilayer test cell 100 includes a ceramic layer 102 that is disposed between a first polymer layer 104 and a second polymer layer 106. Each of the first and second polymer layers is attached to a different corresponding metal (e.g., copper) foil layer 108, 110. For example, a first or top side 112 of the first polymer layer 104 mechanically (e.g., physically) contacts the foil layer 108, and a second or bottom side 114 of the first polymer layer 104, opposite the top side 112, mechanically contacts the ceramic layer 102. A first or top side 116 of the second polymer layer 106 mechanically contacts the ceramic layer 102, and a second or bottom side 118 of the second polymer layer 106 mechanically contacts the foil layer 110. The ceramic layer 102 is composed of a ceramic ion conductor. The two polymer layers 104, 106 are composed of the same polymer electrolyte material. As shown in FIG. 4, the ceramic ion conductor is sandwiched between two polymer electrolytes.

In a first experimental example, the polymer electrolyte material used for the trilayer impedance testing included PEO as the bulk polymer compound and lithium triflate as the lithium salt. The PEO was mixed with the lithium triflate, and the polymer electrolyte material was solid. The ratio of PEO to lithium triflate in the polymer electrolyte material (e.g., PEO:triflate) was 14:1. The PEO was present at two different molecular weights, 8 M and 4 K. The polymer electrolyte material was then cast onto metal foil (e.g., 108, 110) to form the polymer layers 104, 106. The thickness of the polymer electrolyte material on the foil was about 10 microns. The ceramic layer 102 for the trilayer impedance testing included LATP. For example, an LATP pellet was obtained and densified using 3% of a sintering aide. The targeted thickness of the ceramic layer was about 200 microns.

Multiple trilayer test cells were constructed to screen different candidate coupling agents, as well as control setups that were devoid of coupling agents. For each candidate coupling agent, an agent solution was generated that included the specific coupling agent compound, acetic acid, and ethanol. The agent solution was cast onto both sides of the ceramic pellet at 80° C. such that the agent solution coated the ceramic pellet. The surface coupling agent loading (e.g., concentration) was adjusted by the dropcast volume of the agent solution that was applied to the ceramic pellet. The loading of the coupling agent was from 1-2 μg/cm$^2$.

During assembly of the trilayer test cells, the coupling-agent-coated ceramic pellets formed the ceramic layers 102 that were sandwiched between the polymer layers 104, 106. The trilayer cells were then stack annealed at 80° C. for 1 hour before running electrochemical impedance measurements at each of 30° C., 40° C., 50° C., and 60° C.

The trilayer test cells were substantially uniform and identical other than the presence and/or type of coupling agent coated on the ceramic ion conductor. Some of the trilayer test cells that were constructed included different functionalized PEG compounds as coupling agents. The loading of the coupling agents in these test cells was 1 μg/cm$^2$. The functionalized PEG compounds may differ only in the functional groups $R_1$ and $R_2$ at the end of the backbone. For example, at least some of the coupling agents tested had the same number of repeating PEG units in the backbone. In the experimental tests, the coupling agents had 10 repeating PEG units. One trilayer cell was a control cell that had no coupling agent present. The control trilayer cell was tested to provide a baseline interfacial impedance between the polymer electrolyte and the ceramic ion conductor. A comparison example trilayer cell was constructed that had a polymer additive with a non-PEG backbone. In the experimental trilayer test cells, the bulk polymer compound was PEO, the lithium salt was lithium triflate, and the ceramic material was LATP.

Figure 5:
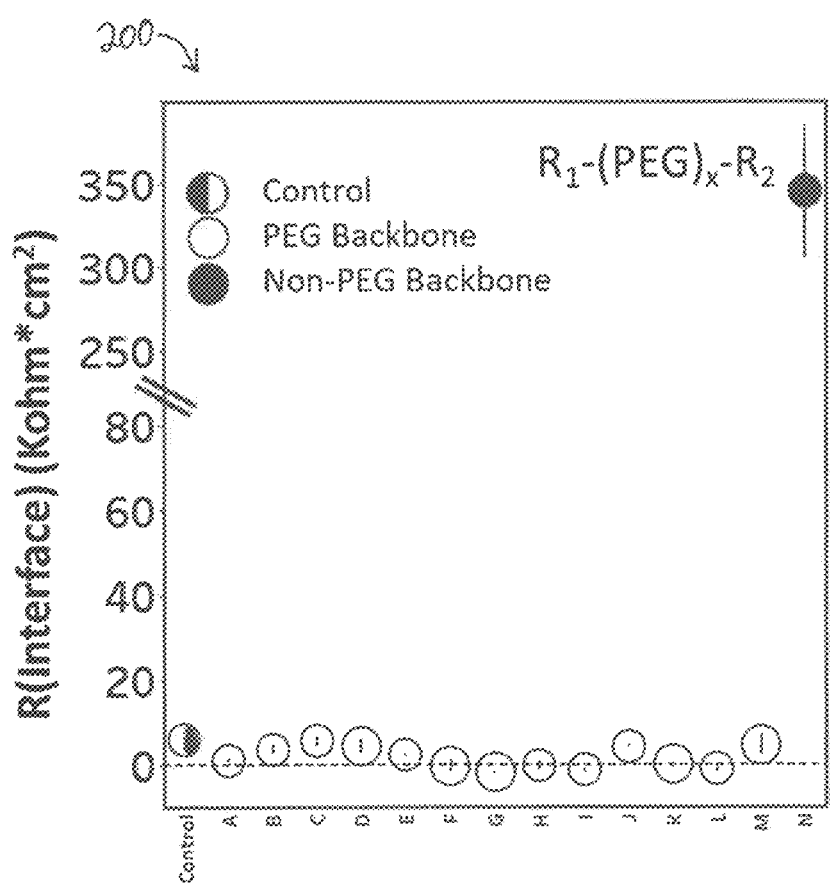
FIG. 5 is a graph showing the interfacial impedance or resistance for different trilayer test cells.

FIG. 5 is a graph 200 showing the interfacial impedance or resistance ("R") for different trilayer test cells. The different trilayer test cells include a control test cell ("Control" in FIG. 5), various trilayer cells with functionalized PEG coupling agents ("PEG backbone"), and a comparison example trilayer cell that has an polymer additive with a non-PEG backbone ("Non-PEG Backbone" and "N" in FIG. 5). The Non-PEG Backbone trilayer cell that was tested includes poly(acrylic) acid (PAA) as an additive. The PEG Backbone trilayer cells are identified based in part on the functional end groups and whether the polymer backbone is linear or branched. The PEG Backbone trilayer cells include a bi-dendate cell (N-acid-PEG3)-N-bid(PEG3-amine) ("A" in FIG. 5), a tri-dendate cell (amino-tri-(carboxyethoxymethyl)-methane) ("B"), a propargyl cell (propargyl-PEG10-amine) ("C"), a trifluoroethyl cell (1,1,1-trifluoroethyl-PEG4-amine) ("D"), a T-butyl ester cell (amino-tri-(carboxyethoxymethyl)-methane) ("E"), an alcohol cell (amino-PEG10-alcohol) ("F"), a bis-amine cell (amino-PEG10-amine) ("G"), an unprotected or activated amino cell (aminooxy-PEG8-acid) ("H"), an azido cell (azido-PEG10-acid) ("I"), a bis-acid cell (bis-PEG10-Acid) ("J"), a protected amino cell (Fmoc-N-amido-PEG10-acid) ("K"), a hydroxy cell (hydroxy-PEG10-acid) ("L"), and a methyltetrazine cell (methyltetrazine-PEG4-acid) ("M"). The vertical axis of the graph 200 represents the interfacial impedance or resistance in units of kOhm*cm$^2$. The data in FIG. 5 was generated from electrochemical impedance spectra collected at 30° C.

FIG. 6 is a table 210 showing the chemical name, letter identifier associated with FIG. 5, functional group class, and chemical structure for each of the functionalized coupling agents of the tested trilayer cells. The table 210 can be used as a key that provides more information about each of the coupling agents in the PEG backbone trilayer cells (e.g., identified as letters A-M) in FIG. 5. In some tested cells, the $R_1$ and $R_2$ functional groups of the functionalized PEG coupling agent were the same. For example, both $R_1$ and $R_2$ in test cell G were amino groups. The functionalized PEG coupling agents in other cells had two different functional groups for $R_1$ and $R_2$. For example, $R_1$ of the coupling agent in test cell I is an amine group, and $R_2$ in the test cell I is a terminal carboxyl group (e.g., carboxylic acid).

The results in FIG. 5 show that all of the test cells with the functionalized PEG coupling agents (e.g., the PEG Backbone cells A-M) demonstrate significantly less interfacial impedance than the control test cell and the poly(acrylic) acid test cell N. These results indicate that the PEG backbone improves the interfacial impedance between the ceramic and PEO polymer, relative to omitting the functionalized PEG coupling agent or replacing the functionalized PEG coupling agent with an acrylate additive. While all test cells with functionalized PEG coupling agents showed reduced impedance relative to the control and acrylated test cells, specific coupling agents that showed the lowest interfacial impedance include bi-dendate (trilayer cell A), alcohol (cell F), bis-amine (cell G), unprotected or activated amino (cell H), azido (cell I), protected amino (cell K), and hydroxy (cell L).

Figure 7:
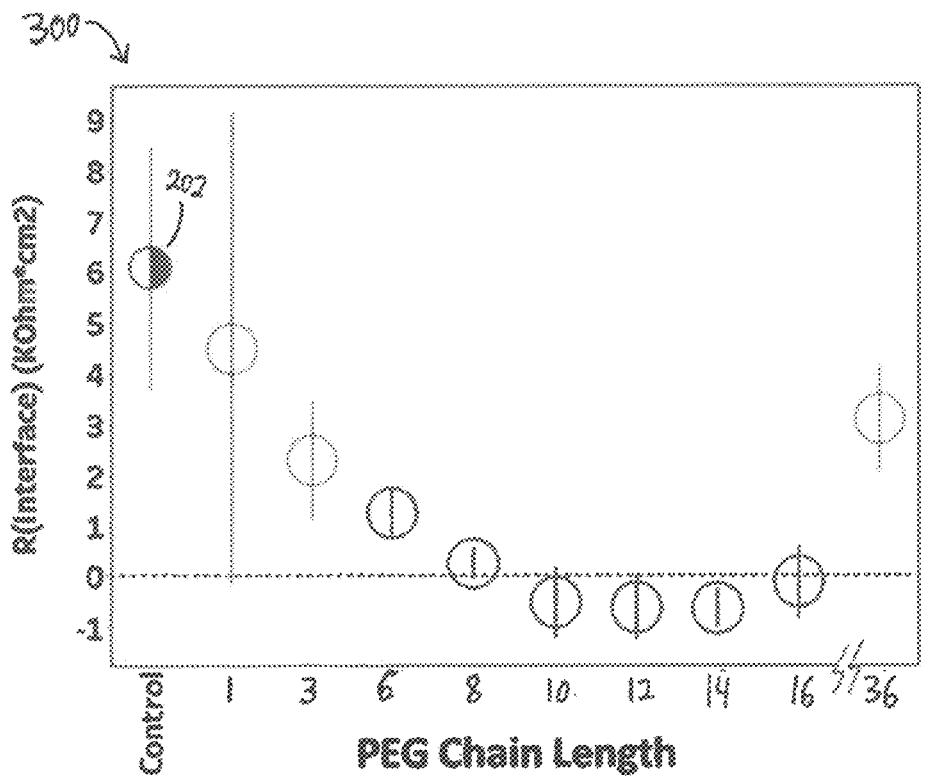
FIG. 7 is a graph showing the interfacial impedance of a specific functionalized PEG coupling agent having different numbers of repeating PEG units in the backbone.

FIG. 7 is a graph 300 showing the interfacial impedance of a specific functionalized PEG coupling agent having different numbers of repeating PEG units in the backbone. The vertical axis of the graph 300 represents the interfacial impedance or resistance in units of kOhm*cm$^2$. The data in FIG. 7 was generated from electrochemical impedance spectra of different trilayer test cells collected at 30° C. The loading of the coupling agents for the trilayer test cells depicted in this graph was maintained at 1 µg/cm². The test cells include the control test cell 202 for reference and multiple test cells that each includes a functionalized PEG coupling agent having formula (e), where $R_1$ is a terminal amino group and $R_2$ is a terminal carboxylic acid group. The integers "1", "3", "6", etc. along the horizontal axis of the graph 300 indicate the number of repeating PEG units in the backbone of the coupling agent (e.g., the variable n in formula (e)). The larger integers represent longer PEG chain backbones. The only differences between the test cells that contain the functionalized PEG coupling agents in FIG. 7 are in the PEG chain backbone lengths. Test cells were constructed to test PEG chain lengths having between 1 and 36 repeating units.

The data in FIG. 7 indicates that there is a relationship between interfacial impedance and the PEG backbone length. For example, as the PEG backbone length initially increases from 1, the interfacial impedance decreases at first until a local minima is reached at about 10 to 14 repeat units. As the backbone length increases beyond this group associated with the local minima, the interfacial impedance increases. The trend line of the impedance in FIG. 7 is essentially parabolic. FIG. 7 indicates that functionalized PEG coupling agents that have from 8 to 16 repeating units in the backbone are preferred for providing low interfacial impedance. A narrower range of preferred functionalized PEG coupling agents have from 10 to 14 repeating PEG units in the backbone. This data suggests that the chain length of the functionalized coupling agent effects how the coupling agent interacts with the ceramic and the polymer electrolyte material. Sterics may play a role in lowering the interfacial impedance. For example, if the backbone is too short (e.g., shorter than 8 repeat units in the tested example), the coupling agent may not successfully bridge the gap at the interface between the ceramic and the polymer electrolyte to form a reliable ion transport path. On the other hand, if the backbone is too long (e.g., longer than 16 repeat units in the tested example), the polymer chains of the coupling agent may congest the gap at the interface, essentially interfering with and obstructing ion transport at the interface.

The data shown in FIG. 7 may be dependent, at least in part, on the specific functional groups $R_1$ and $R_2$ tested, such that the preferred number of PEG repeating units to provide lowest interfacial impedance may differ, at least slightly, for functionalized PEG-backbone coupling agents that have different functional groups. For example, the preferred number or range of repeat units for a bi-dendate coupling agent such as (N-acid-PEG3)-N-bid(PEG3-amine) (A in FIG. 5) may differ from the preferred number or range of repeat units for a bis-amine coupling agent such as amino-PEG10-amine (G in FIG. 5).

Experimental examples of composite solid state electrolytes were formed based on the results of the trilayer testing. For example, the best-performing coupling agents from the trilayer testing were used to prepare different corresponding composite solid state electrolytes. To form the composite solid state electrolytes, the polymer electrolyte material was formed into free-standing polymer films. In some of the examples, the polymer electrolyte material included PEO and lithium triflate. The thickness of the free-standing polymer films was about 30 microns. The ceramic ion conductor selected was synthesized LATP powder. Functionalized coupling agents were coated onto the ceramic LATP powder. For each solid state electrolyte, an agent solution of the selected coupling agent, acetic acid, and ethanol was made and then a specific amount of the LATP powder was added to the agent solution and allowed to mix for a certain duration (e.g., 3-24 hours). After that duration, the mixture was centrifuged and dried to remove the liquid phase and form a coupling agent-coated ceramic. This coupling agent-coated ceramic was combined with the free-standing polymer film to form the composite solid state electrolyte.

Figure 8:
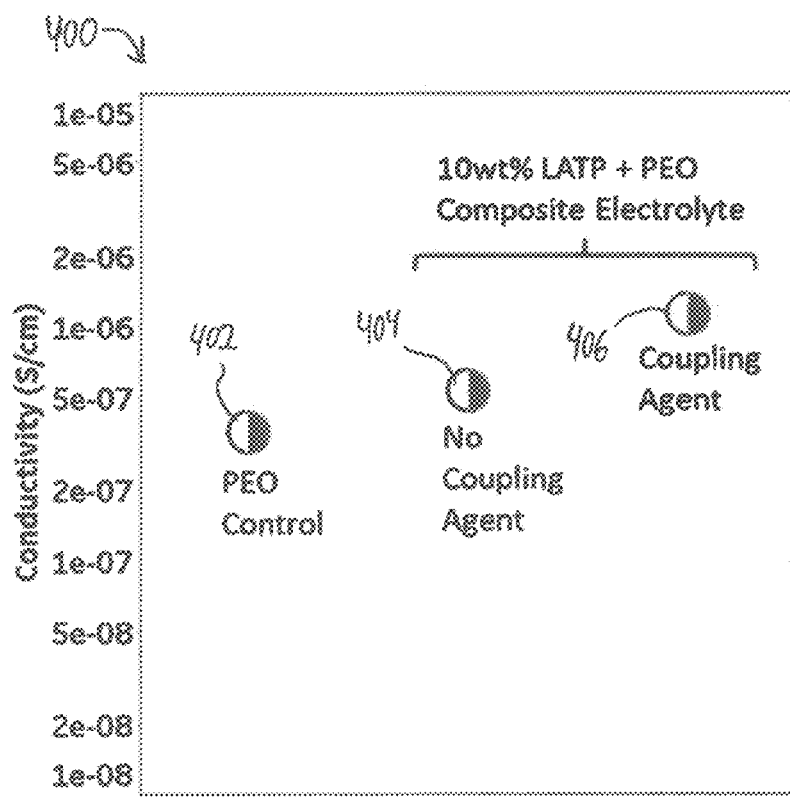
FIG. 8 is a graph of the ionic conductivity for three different electrolytes.

FIG. 8 is a graph 400 of the ionic conductivity for three different electrolytes. The ionic conductivity is shown in units of S/cm, and the data in FIG. 8 is from electrochemical impedance spectra collected at 30° C. The three electrolytes include a control polymer electrolyte 402, a control composite electrolyte 404, and an example electrolyte 406 that includes a functionalized coupling agent. The control polymer electrolyte 402 is a pure polymer such that there is no ceramic ion conductor or coupling agent present. The control composite electrolyte 404 is a ceramic-polymer composite electrolyte that does not have a coupling agent present. The control composite electrolyte 404 has PEO bulk polymer and LATP ceramic. The loading (or concentration) of the LATP ceramic is about 10 weight percent (wt. %) relative to a total weight of the solid state electrolyte. The example electrolyte 406 is a ceramic-polymer composite electrolyte that includes at least one functionalized coupling agent, as described herein. The example electrolyte 406 may be identical to the control composite electrolyte 404 except for the addition of at least one functionalized coupling agent. For example, the example electrolyte 406 may include both an amine functionalized PEG (10) (e.g., 10 repeating PEG units in the backbone) coupling agent and a hydroxy functionalized PEG (10) coupling agent.

FIG. 8 shows that the example electrolyte 406 has greater ionic conductivity than the two control electrolytes 402, 404. For example, the control composite electrolyte 404 has greater conductivity than the control polymer electrolyte 402, indicating that the addition of the ceramic is beneficial. The increase in conductivity from the control composite 404 to the example electrolyte 406 indicates that the presence of the functionalized PEG coupling agents further improve the ionic conductivity. These results show that the coupling agents lower the interfacial impedance between the ceramic and polymer in a composite solid state electrolyte, increasing the extent of ionic transport through the ceramic phase rather than the polymer phase.

Figure 9:
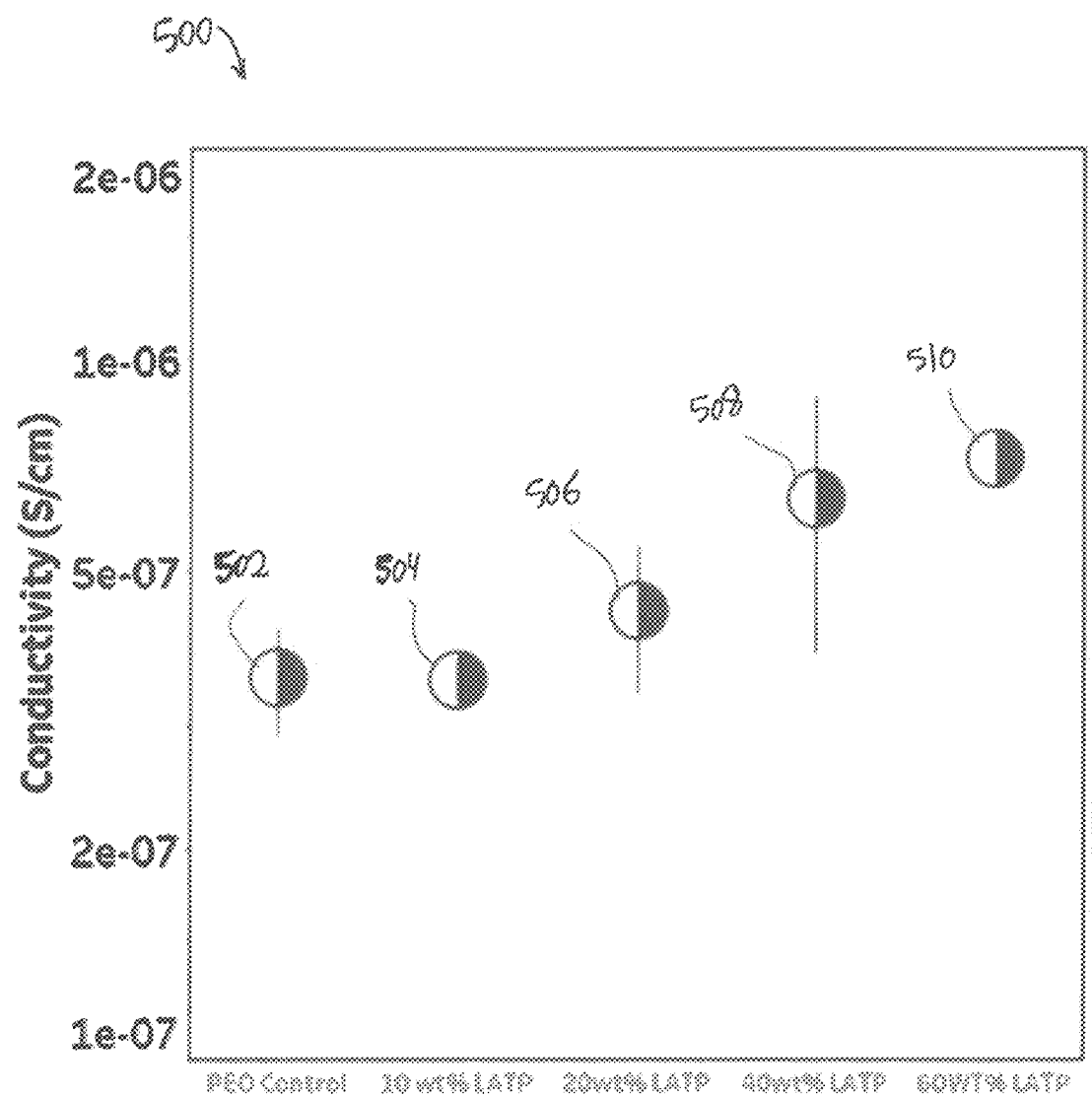
FIG. 9 is a graph showing the ionic conductivity for a control polymer electrolyte and multiple composite solid state electrolytes according to an embodiment which differ only in the ceramic loading.

FIG. 9 is a graph 500 showing the ionic conductivity for a control polymer electrolyte 502 and multiple composite solid state electrolytes according to an embodiment which differ only in the ceramic loading. For example, the composite solid state electrolytes are all ceramic-polymer composites that include at least one functionalized coupling agent. The first composite solid state electrolyte 504 includes a ceramic loading of 10 wt. % LATP relative to a total weight of the electrolyte. The second composite solid state electrolyte 506 includes a ceramic loading of 20 wt. % LATP relative to the total weight of the electrolyte. The third composite solid state electrolyte 508 includes a ceramic loading of 40 wt. % LATP relative to the total weight of the electrolyte. The fourth composite solid state electrolyte 510 includes a ceramic loading of 60 wt. % LATP relative to the total weight of the electrolyte. The data is generated from electrochemical impedance spectra collected at 30° C.

FIG. 9 shows that none of the four tested composite solid state electrolytes 504, 506, 508, 510 has lower ionic conductivity than the pure polymer electrolyte 502. The first composite solid state electrolyte 504 has a similar conductivity as the pure polymer electrolyte 502, but the other composite solid state electrolytes 506, 508, 510 had significantly greater ionic conductivity than the polymer electrolyte 502. The data also shows a correlation between the ceramic concentration and ionic conductivity, such that increasing the ceramic concentration from 10 wt. % to 60 wt. % increases the ionic conductivity of the electrolyte. In an embodiment, the ceramic loading is preferably at least 20 wt. %, such as at least 40 wt. %. In an embodiment, the ceramic loading may be in a range from 20 wt. % to 60 wt. %.

In a second experimental example, additional trilayer test cells were assembled in which the polymer electrolyte material included PVDF as the bulk polymer compound instead of PEO. The additional trilayer test cells shared some other components in common with the first experimental example, including the use of lithium triflate as the lithium salt and LATP as the ceramic layer. Multiple trilayer test cells were assembled to test the effect of different coupling agents on the interfacial impedance.

Figure 10:
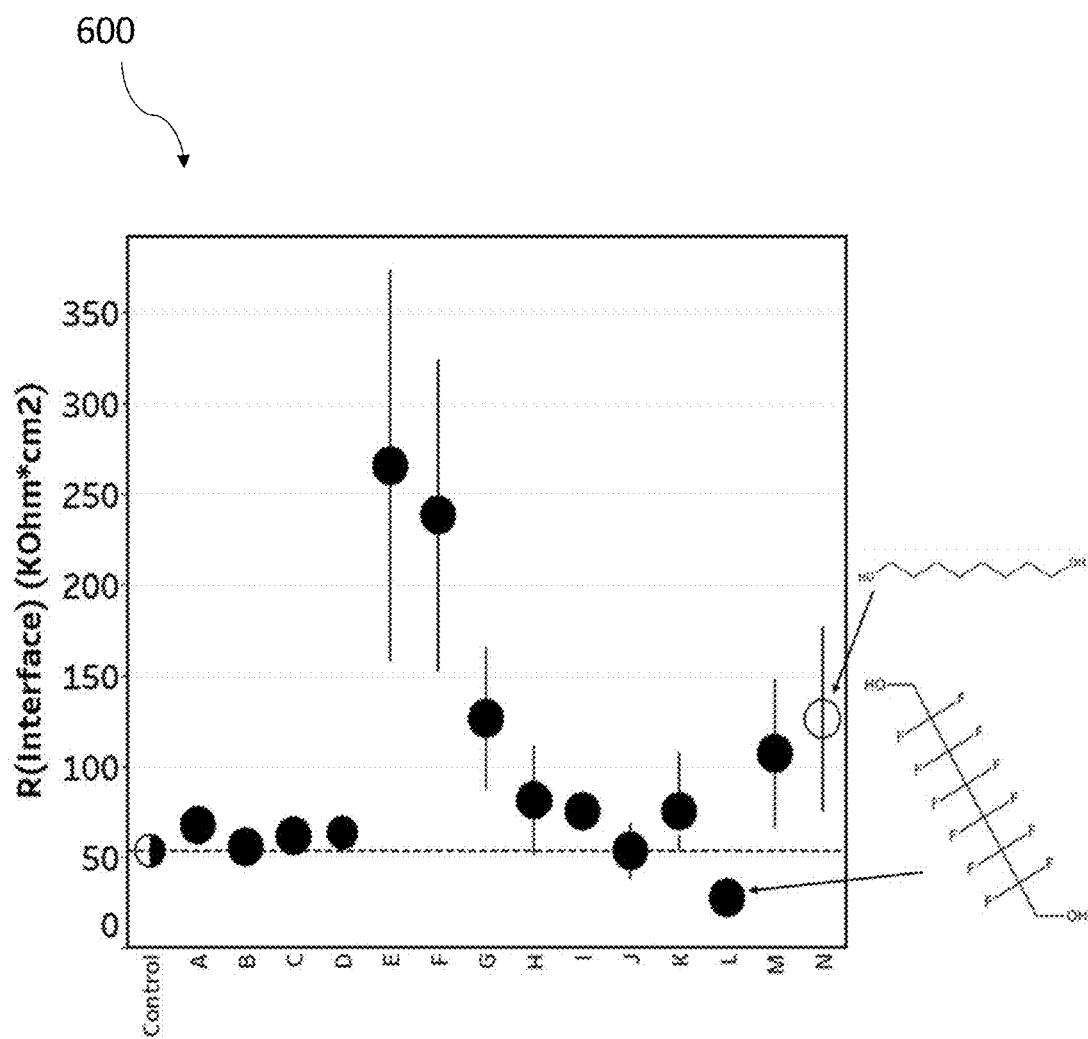
FIG. 10 is a graph showing the interfacial impedance or resistance ("R") for different trilayer test cells that have PVDF as the bulk polymer compound.

FIG. 10 is a graph 600 showing the interfacial impedance or resistance ("R") for different trilayer test cells that have PVDF as the bulk polymer compound. The different trilayer test cells shown in FIG. 10 include a control test cell ("Control" in FIG. 10), various trilayer cells with functionalized coupling agents that include a fluorinated backbone (letters "A" through "M" in FIG. 10), and a comparison example trilayer cell that has an polymer additive with a non-fluorinated backbone ("N" in FIG. 10). The comparison example trilayer cell ("N") that was tested included 1,8-octanediol alcohol as the additive. The coupling agents with fluorinated backbones may have perfluorinated alkyl backbones, including C—F bonds. The vertical axis of the graph 600 represents the interfacial impedance or resistance in units of kOhm*cm$^2$. The data in FIG. 10 was generated from electrochemical impedance spectra collected at 30° C.

FIG. 11 is a table 610 showing the chemical name, letter identifier associated with FIG. 10, functional group class of at least one end unit, and chemical structure for each of the functionalized coupling agents of the tested trilayer cells in FIG. 10. The table 610 can be used as a key that provides more information about each of the coupling agents in the trilayer cells (e.g., identified as letters A-N) in FIG. 10.

The test cells with the fluorinated coupling agents may be identified based in part on the functional end groups. For example, a first group of test cells identified as cells A through F have at least one carboxylic acid functional group end unit. A second group of test cells, cells G through I, have at least one acrylate functional group end unit. A third group of test cells, cells J and K, have at least one nitrogen-containing functional group end unit. A fourth group of test cells, cells L and M, have at least one hydroxyl functional group end unit. The comparison example trilayer cell N also has hydroxyl functional groups at the end units.

The trilayer cells in FIGS. 10 and 11 include perfluoro-3,7-dimethyloctanoic acid as the coupling agent in cell A; 2-(4,4,5,5,6,6,6-heptafluorohexyl)malonic acid as the coupling agent in cell B; difluoromalonic acid as the coupling agent in cell C; perfluoro(2,5-dimethyl-3,6-dioxanonanoic acid as the coupling agent in cell D; dodecafluorosuberic acid as the coupling agent in cell E; hexafluoroglutaric acid as the coupling agent in cell F; 2,2,3,3,4,4,5,5-octafluoro-1,6-hexyl diacrylate as the coupling agent in cell G; 2,2,3,4,4,4-hexafluorobutyl acrylate as the coupling agent in cell H; 1H,1H,2H,2H-heptadecafluorodecyl methacrylate as the coupling agent in cell I; heptafluorobutyrylamidine as the coupling agent in cell J; 1H,1H-pentadecafluorooctylamine as the coupling agent in cell K; 2,2,3,3,4,4,5,5,6,6,7,7-dodecafluoro-1,8-octanediol as the coupling agent in cell L; and 1H,1H,11H-eicosafluoro-1-undecanol as the coupling agent in cell M. All of these coupling agents have a per fluorinated backbone, including C—F bonds, and at least one functional group end unit. The comparison example trilayer cell N has 1,8-octanediol as the coupling agent, which is a non-fluorinated alcohol.

The results in FIG. 10 show that coupling agents that have backbones with similar structure as (e.g., compatible with) the bulk polymer reduces the interfacial impedance over a backbone with a dissimilar structure. For cells that use PVDF as the bulk polymer, as in this experimental example, the coupling agents that have per fluorinated alkyl chain (e.g., C—F) backbones generally demonstrate lower interfacial impedance between the ceramic and the PVDF polymer than coupling agents with non-fluorinated backbones. For example, the coupling agent in the test cell L (e.g., 2,2,3,3,4,4,5,5,6,6,7,7-dodecafluoro-1,8-octanediol) has the same hydroxyl functional groups as the coupling agent in the comparison cell N (e.g., 1,8-octanediol), and differ only in the backbone structure. As shown in FIG. 10, the C—H backbone in the coupling agent of cell N results in a significantly higher resistance than the C—F backbone in the coupling agent of cell L.

The only test cells with fluorinated backbone coupling agents that demonstrated similar or worse impedance than the comparison test cell N, with a non-fluorinated coupling agent, were cells E, F, and G. The coupling agents in cells E and F have carboxylic acid groups at both end units and have longer backbones than the coupling agent in cell C. Without being bound by any particular theory, the combination of the acid groups at each end and the relatively long backbone may interfere with the ability of the coupling agent to provide ion transport at the interface between the ceramic and the polymer electrolyte material. The coupling agent in cell G has acrylate functional groups at both end units. Relative to the coupling agent in cell H which has only one acrylate functional group, the acrylate functional groups at both ends may interfere with the ability of the coupling agent to provide ion transport at the interface between the ceramic and the polymer electrolyte material.

Between the coupling agents that have per fluorinated alkyl chain backbones in cells A through M, the variation in measured impedance results from the presence of different functional groups at the end unit(s). For example, the test cell that showed the lowest interfacial impedance was cell L, which has a coupling agent with a hydroxyl functional group at both ends of the perfluorinated alkyl chain. This cell demonstrated a 50% reduction of interfacial resistance over the control test cell that lacked any coupling agent. The second-best performing cell was cell J, which has a coupling agent with a single nitrogen-containing group (e.g., amidine) at one end of the perfluorinated alkyl chain. The cells A through D, with coupling agents that include carboxylic acid functional groups, also performed well. The coupling agents in cells A, B, and D only have carboxylic acid functional groups at one end of the respective backbone. The coupling agent in cell C has carboxylic acid functional groups at both ends, but the backbone is short, including only a single carbon element bonded to two fluorine elements.

The composite solid state electrolyte according to the embodiments described herein can be used to produce a lithium ion battery. The lithium ion battery includes a cathode, an anode, and the composite solid state electrolyte. In an embodiment, no separator is present, but a separator may be installed in an alternative embodiment. The composite solid state electrolyte is disposed between and separates the cathode and the anode. In an embodiment, no liquid or gel phase is present in the battery.

The lithium ion battery may be a secondary battery, such that the battery is rechargeable. Discharging and charging of the battery may be accomplished by reversible intercalation and de-intercalation, respectively, of lithium ions into and from the host materials of the anode and the cathode. The composite solid state electrolyte is designed to have a ceramic compound, a bulk polymer compound, a lithium salt, and at least one functionalized coupling agent. The bulk polymer compound and the lithium salt form a solid state polymer electrolyte material. The functionalized coupling agent reduces the interfacial impedance between the ceramic and polymer electrolyte phases, which enables lithium ion and electron transport through the electrolyte between the cathode and the anode during the discharge and recharge operations. The low interfacial impedance enables more ion transport through the ceramic compound relative to the bulk polymer compound, which beneficially increases the ionic conductivity of the electrolyte (relative to a composite ceramic-polymer solid state electrolyte that has higher interfacial impedance). The voltage of the battery may be based on redox potentials of the anode and the cathode, where lithium ions are accommodated or released at a lower potential in the former and a higher potential in the latter.

Examples of suitable cathode materials include phosphates, fluorophosphates, fluorosulfates, fluorosilicates, spinels, lithium-rich layered oxides, and composite layered oxides. Further examples of suitable cathode materials include: spinel structure lithium metal oxides, layered structure lithium metal oxides, lithium-rich layered structured lithium metal oxides, lithium metal silicates, lithium metal phosphates, metal fluorides, metal oxides, sulfur, and metal sulfides. Non-limiting examples of specific cathode active materials include lithium cobalt oxide (e.g., $LiCoO_2$), lithium nickel manganese cobalt oxides ("NMC"), lithium nickel cobalt aluminum oxides ("NCA") (e.g., $LiNi_{0.8}Co_{0.15}Al_{0.05}O_2$), $LiNi_{0.5}Mn_{1.5}O_4$ ("LNMO"), lithium iron phosphate ($LiFePO_4$) ("LFP"), $LiMn_{0.8}Fe_{0.2}PO_4$ ("LMFP"), and the like. The formula for NMC may be $LiNi_xMn_yCo_zO_w$, where $0<x<1$, $0<y<1$, $0<z<1$, $x+y+z=1$, and $0<w\leq2$. NMC cathode materials include, but are not limited to, electrically active materials containing $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, and $LiNi_{0.5}Mn_{0.3}Co_{0.2}O_2$.

Examples of suitable anode materials include conventional anode materials used in lithium ion batteries, such as lithium, graphite ("$Li_xC_6$"), silicon, and other carbon, silicate, or oxide-based anode materials, as well as composite alloys that combine multiple anode materials.

The lithium ion battery may be manufactured by producing the anode, the cathode, and the composite solid state electrolyte as discrete solid films. The assembly process may include stacking the films such that the electrolyte is between the cathode and the anode, and then rolling or folding the stacked films to increase the cell density and conform to a packaging form factor.

In one or more embodiments, a composite solid state electrolyte is provided that comprises a polymer electrolyte material, a ceramic ion conductor, and a functionalized coupling agent selected to be compatible with the ceramic ion conductor and the bulk polymer compound. The polymer electrolyte material comprises a bulk polymer compound and a lithium salt. The functionalized coupling agent has a backbone that is structurally similar to the bulk polymer compound.

Optionally, the bulk polymer compound comprises polyethylene oxide (PEO), and the backbone of the functionalized coupling agent comprises polyethylene glycol (PEG). The backbone of the functionalized coupling agent may have no less than 8 and no more than 16 repeating units. Optionally, the backbone of the functionalized coupling agent has no less than 10 and no more than 14 repeating units. Optionally, the functionalized coupling agent is one of N-(acid-PEG3)-N-bis(PEG3-amine), amino-PEG10-alcohol, amino-PEG10-amine, aminooxy-PEG8-acid, azido-PEG10-acid, Fmoc-N-amido-PEG10-acid), or hydroxy-PEG10-acid.

Optionally, the bulk polymer compound comprises polyvinylidene difluoride (PVDF), and the backbone of the functionalized coupling agent comprises a perfluorinated alkyl. The functionalized coupling agent may comprise at least one hydroxyl functional group at an end of the backbone. Optionally, the functionalized coupling agent is one of 2,2,3,3,4,4,5,5,6,6,7,7-dodecafluoro-1,8-octanediol, heptafluorobutyrylamidine, or 2-(4,4,5,5,6,6,6-heptafluorohexyl)malonic acid.

Optionally, the ceramic ion conductor comprises lithium aluminum titanium phosphate (LATP). Optionally, the lithium salt comprises lithium triflate.

Optionally, the ceramic ion conductor is present at a concentration of at least 10 weight percent relative to a total weight of the composite solid state electrolyte. Optionally, the functionalized coupling agent is compatible with each of the bulk polymer compound and the ceramic ion conductor via at least one of a chemical bond or attractive intermolecular forces.

In one or more embodiments, a lithium ion battery is provided that comprises a cathode capable of reversible intercalation of lithium ions, an anode, and a composite solid state electrolyte. The composite solid state electrolyte comprises a polymer electrolyte material, a ceramic ion conductor, and a functionalized coupling agent selected to be compatible with the ceramic ion conductor and the bulk polymer compound. The polymer electrolyte material comprises a bulk polymer compound and a lithium salt. The functionalized coupling agent has a backbone that is structurally similar to the bulk polymer compound.

Optionally, the ceramic ion conductor comprises lithium aluminum titanium phosphate (LATP). Optionally, the lithium salt comprises lithium triflate.

Optionally, the bulk polymer compound comprises polyethylene oxide (PEO), and the backbone of the functionalized coupling agent comprises polyethylene glycol (PEG). The backbone of the functionalized coupling agent may have no less than 8 and no more than 16 repeating units.

Optionally, the bulk polymer compound comprises polyvinylidene difluoride (PVDF), and the backbone of the functionalized coupling agent comprises a perfluorinated alkyl. The functionalized coupling agent may comprise at least one hydroxyl functional group at an end of the backbone.

In one or more embodiments, a composite solid state electrolyte is provided that comprises a polymer electrolyte material, lithium aluminum titanium phosphate (LATP) as a ceramic ion conductor, and a functionalized coupling agent. The polymer electrolyte material comprises a bulk polymer compound and lithium triflate salt. The bulk polymer compound comprises polyethylene oxide (PEO) or polyvinylidene difluoride (PVDF). The functionalized coupling agent is selected to be compatible with the ceramic ion conductor and the bulk polymer compound. The functionalized coupling agent has a backbone that comprises polyethylene glycol (PEG) when the bulk polymer compound comprises PEO, and the backbone comprises a perfluorinated alkyl when the bulk polymer compound comprises PVDF.

As used herein, value modifiers such as "about," "substantially," and "approximately" inserted before a numerical value indicate that the value can represent other values within a designated threshold range above and/or below the specified value, such as values within 5%, 10%, or 15% of the specified value.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite solid state electrolyte comprising:
   a polymer electrolyte material comprising a bulk polymer compound and a lithium salt;
   a ceramic ion conductor; and
   a functionalized coupling agent selected to be compatible with the ceramic ion conductor and the bulk polymer compound, wherein the functionalized coupling agent has a backbone that is structurally similar to the bulk polymer compound.

2. The composite solid state electrolyte of claim 1, wherein the bulk polymer compound comprises polyethylene oxide (PEO), and the backbone of the functionalized coupling agent comprises polyethylene glycol (PEG).

3. The composite solid state electrolyte of claim 2, wherein the backbone of the functionalized coupling agent has no less than 8 and no more than 16 repeating units.

4. The composite solid state electrolyte of claim 2, wherein the backbone of the functionalized coupling agent has no less than 10 and no more than 14 repeating units.

5. The composite solid state electrolyte of claim 2, wherein the functionalized coupling agent is one of N-(acid-PEG3)-N-bis(PEG3-amine), amino-PEG10-alcohol, amino-PEG10-amine, aminooxy-PEG8-acid, azido-PEG10-acid, Fmoc-N-amido-PEG10-acid), or hydroxy-PEG10-acid.

6. The composite solid state electrolyte of claim 1, wherein the bulk polymer compound comprises polyvinylidene difluoride (PVDF), and the backbone of the functionalized coupling agent comprises a perfluorinated alkyl.

7. The composite solid state electrolyte of claim 6, wherein the functionalized coupling agent comprises at least one hydroxyl functional group at an end of the backbone.

8. The composite solid state electrolyte of claim 6, wherein the functionalized coupling agent is one of 2,2,3,3,4,4,5,5,6,6,7,7-dodecafluoro-1,8-octanediol, heptafluorobutyrylamidine, or 2-(4,4,5,5,6,6,6-heptafluorohexyl)malonic acid.

9. The composite solid state electrolyte of claim 1, wherein the ceramic ion conductor comprises lithium aluminum titanium phosphate (LATP).

10. The composite solid state electrolyte of claim 1, wherein the lithium salt comprises lithium triflate.

11. The composite solid state electrolyte of claim 1, wherein the ceramic ion conductor is present at a concentration of at least 10 weight percent relative to a total weight of the composite solid state electrolyte.

12. The composite solid state electrolyte of claim 1, wherein the functionalized coupling agent is compatible with each of the bulk polymer compound and the ceramic ion conductor via at least one of a chemical bond or attractive intermolecular forces.

13. A lithium ion battery comprising:
   a cathode capable of reversible intercalation of lithium ions;
   an anode; and
   a composite solid state electrolyte comprising:
      a polymer electrolyte material comprising a bulk polymer compound and a lithium salt;
      a ceramic ion conductor; and
      a functionalized coupling agent selected to be compatible with the ceramic ion conductor and the bulk polymer compound, wherein the functionalized coupling agent has a backbone that is structurally similar to the bulk polymer compound.

14. The lithium ion battery of claim 13, wherein the ceramic ion conductor comprises lithium aluminum titanium phosphate (LATP).

15. The lithium ion battery of claim 13, wherein the lithium salt comprises lithium triflate.

16. The lithium ion battery of claim 13, wherein the bulk polymer compound comprises polyethylene oxide (PEO), and the backbone of the functionalized coupling agent comprises polyethylene glycol (PEG).

17. The lithium ion battery of claim 16, wherein the backbone of the functionalized coupling agent has no less than 8 and no more than 16 repeating units.

18. The lithium ion battery of claim 13, wherein the bulk polymer compound comprises polyvinylidene difluoride (PVDF), and the backbone of the functionalized coupling agent comprises a perfluorinated alkyl.

19. The lithium ion battery of claim 18, wherein the functionalized coupling agent comprises at least one hydroxyl functional group at an end of the backbone.

20. A composite solid state electrolyte comprising:
a polymer electrolyte material comprising a bulk polymer compound and lithium triflate salt, wherein the bulk polymer compound comprises one of polyethylene oxide (PEO) or polyvinylidene difluoride (PVDF);
lithium aluminum titanium phosphate (LATP) as a ceramic ion conductor; and
a functionalized coupling agent selected to be compatible with the ceramic ion conductor and the bulk polymer compound, wherein the functionalized coupling agent has a backbone that comprises polyethylene glycol (PEG) when the bulk polymer compound comprises PEO, and the backbone comprises a perfluorinated alkyl when the bulk polymer compound comprises PVDF.

* * * * *